United States Patent Office
3,494,799
Patented Feb. 10, 1970

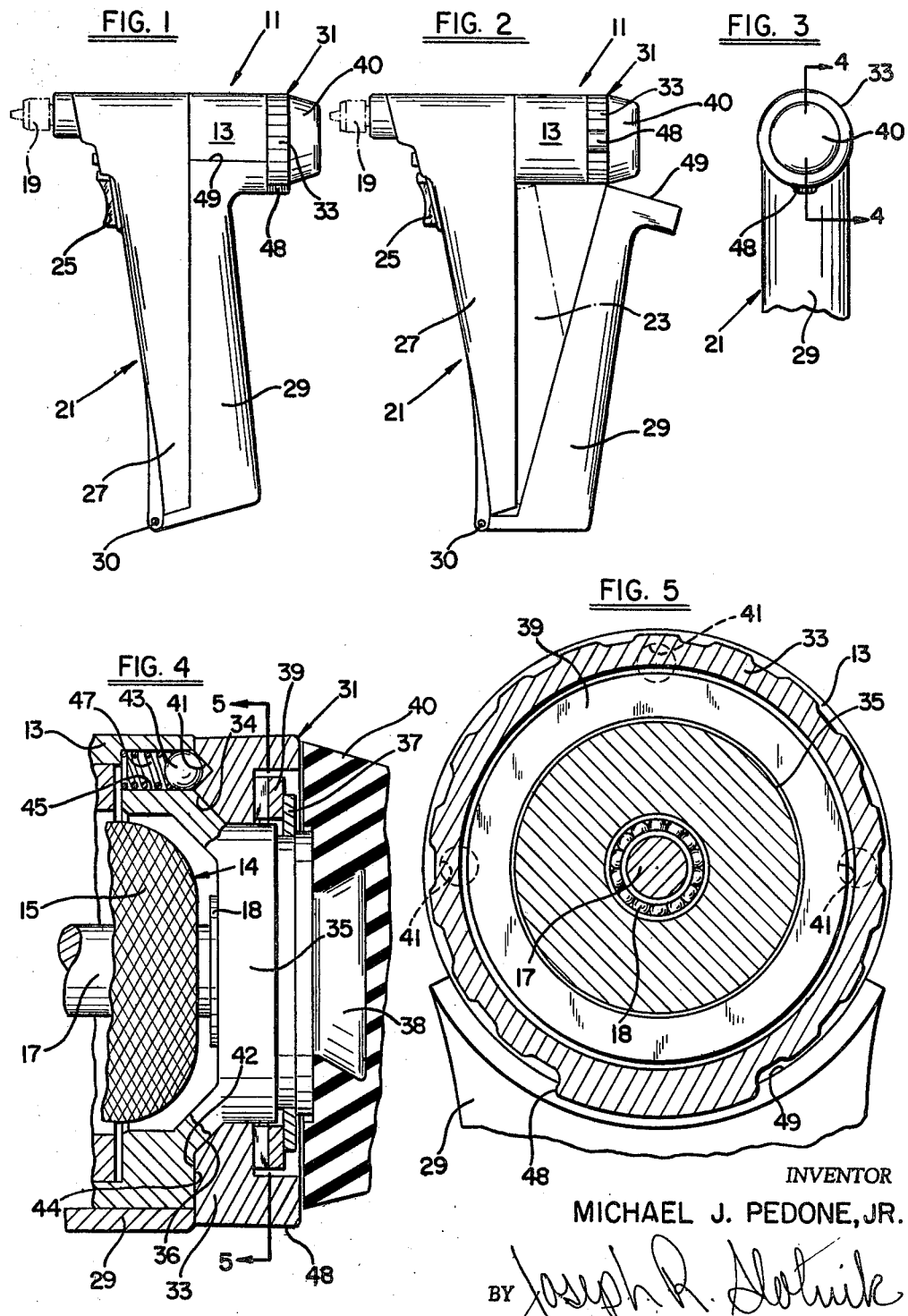

3,494,799
BATTERY ACCESS HANDLE FOR CORDLESS
ELECTRIC DEVICE
Michael J. Pedone, Jr., Lutherville, Md., assignor to The
Black and Decker Manufacturing Company, Towson,
Md., a corporation of Maryland
Filed Oct. 1, 1968, Ser. No. 764,275
Int. Cl. H01m 1/04
U.S. Cl. 136—173                                    8 Claims

ABSTRACT OF THE DISCLOSURE

A portable electric device of the cordless variety includes a housing encasing a motor and having a pendant-type handle. A battery is supported within the handle which is novelly constructed to provide ready access to the battery for inspection, recharging and/or replacement.

SUMMARY OF THE INVENTION

The present invention deals specifically with a battery encasing handle for a portable, cordless electric device, which handle is readily openable to fully expose the battery for removal. In addition, the handle is securely retained in the closed position and the overall construction presents a neat and aesthetically pleasing appearance.

Main objects of the present invention, therefore, are to provide a novel battery encasing handle for a portable, cordless electric device, which handle is capable of being readily opened for battery removal while being simply but securely retained in a closed position.

Further objetcs of the present invention are to provide a handle construction of the above character which provides for easy handling of the device, which is neat and aesthetically pleasing in appearance, inexpensive to manufacture, rugged in construction and reliable in use.

Other objetcs and advantages of the invention will become more apparent from a consideration of the detailed description to follow taken together with the drawings annexed hereto.

BRIEF DESCRIPTION OF THE DRAWINGS

FIG. 1 is a side elevational view illustrating a cordless, portable electric device embodying the present invention and shown with the handle in the closed position;

FIG. 2 is a view similar to FIG. 1 and showing the handle partially open;

FIG. 3 is an end view of a portion of FIG. 1;

FIG. 4 is an enlarged sectional view of FIG. 3 taken along line 4—4 thereof; and FIG. 5 is a sectional view of FIG. 4 taken along the line 5—5 thereof.

BROAD STATEMENT OF THE INVENTION

Broadly described, the present invention relates to a cordless, portable electric device comprising a housing having an electric load supported therein, a handle depending from said housing, said handle having a first portion rigid with said housing and a second portion pivoted for movement relative to said first portion from a first position adjacent said first portion to a second position remote therefrom, said first and second portions together defining a closed cavity, a battery supported within said cavity and adapted to power said load, and latch means on said housing releasably securing said second portion in said first position.

DETAILED DESCRIPTION

Referring now more specifically to the drawings, a cordless electric screwdriver embodying the present invention is illustrated generally at 11 in FIGS. 1 and 2. It is to be understood, however, that this tool is for purposes of illustration only and that the present invention finds use in the general class of cordless, portable, electric devices.

With this in mind, the screwdriver 11 is seen to include a housing 13 having a motor 14 disposed therein. The motor 14, as seen in FIG. 4, includes armature windings 15 and an armature shaft 17 supported by bearings 18 (only one of which is shown) and operatively connected in suitable fashion to a tool chuck 19. A pendant-type handle 21 depends from the housing 13 and has a motor powering battery 23 encased therein. Motor operation is controlled in the usual manner by a trigger switch 25 disposed on the front of the handle 21.

It will be appreciated that the batteries in devices of this type require periodic recharging and eventually need to be replaced. Thus, it becomes important that the battery 23 be readily accessible and removable for inspection, recharging and/or replacement. However, it is equally important that the battery 23 be securely encased and that cumbersome or unsightly attachments or fasteners be avoided.

To this end, the handle 21 of the present invention includes a two-part construction, one part of which is pivoted relative to the other and which, when in one position, define a closed cavity for receiving the battery while in another position permit free access to and removal of the battery. Simple but efficient latching means for the handle is built into the existing construction and is constructed to securely hold the handle parts closed about the battery while facilitating quick release to expose the battery for removal when desired.

Thus, as shown in FIGS. 1 and 2, the handle 21 includes a first portion 27 which is integral or otherwise formed rigid with the housing 13, and a second portion 29 which is pivoted by a pin 30 to the first portion 27. Each of the handle portions 27, 29 is hollow and when in a first or closed position, as shown in FIG. 1, completely encase the battery 23 therein. However, when the handle portion 29 is released, it may be pivoted about the pin 30, as shown in FIG. 2, to expose the battery 23. When the handle is fully opened, the battery 23 may be removed pursuant to recharging or replacement thereof.

To releasably secure the handle portion 29 in the closed position, shown in FIG. 1, a novel latch means generally indicated at 31 is provided. This latch means, shown in greater detail in FIGS. 4 and 5, includes a ring 33 rotatably supported upon a bearing hub 35 which forms part of the housing 13. The ring 33 has a conical face 34 which confronts a conical surface 36 on the hub 35 and is held in place thereon by a retaining washer 37. A wavy washer 39 between the washer 37 and the ring 33 biases the latter axially toward the left as seen in FIG. 4. A bumper member 40 of suitable resilient material is mounted on a projecting part 38 of the housing 13 and protects the ring 33.

The ring 33 has a plurality of detent recesses 41 formed in a radial face 42 thereof which confronts a radial face 44 on the housing 13. These recesses 41 are positionable, by turning the ring 33, to selectively receive a detent ball 43 carried within an axial bore 45 in the housing 13. A compression spring 47 within the bore 45 biases the ball 43 outwardly thereof and serves to releasably hold the ring 33 against turning on the hub 35 when the ball 43 is in one of the recesses 41.

The ring 33 also has a radially outwardly extending lug 48 formed thereon which, when the handle portion 29 and the ring 33 are in the position shown in FIGS. 1 and 3–5, holds the handle portion 29 securely against the handle portion 27 and both portions 27, 29 closed about the battery 23. The handle portion 29 has an arcuate portion 49 adapted to snugly engage the housing 13 and when the parts are in the position shown in FIG. 1, the lug 48 engages behind the arcuate portion 49 and holds the handle portion 29 in place against the handle portion 27.

When it is desired to remove the battery 23, either for inspection, recharging or replacement, the ring 33 need only be turned 90° in either direction so that the detent ball 43 is relocated in one of the other detent recesses 41. The handle portion 29 can then be pivoted away from the portion 27 and the battery 23 is easily removed from the handle 21. When a battery 23 is reinserted into the handle portion 27, the handle portion 29 is pivoted back to the closed position and the ring 33 turned back through 90° to reposition the lug 37 behind the arcuate portion 39.

By the foregoing, there has been disclosed a novel battery access handle for cordless, portable electric devices calculated to fulfill the inventive objects hereinabove set forth, and while a preferred embodiment of the present invention has been illustrated and described in detail, various additions, substitutions, modifications and omissions may be made thereto without departing from the spirit of the invention as encompassed by the appended claims.

I claim:

1. A cordless, portable electric device comprising a housing having an electric load supported therein, a handle depending from said housing, said handle having a first portion rigid with said housing and a second portion pivoted for movement relative to said first portion from a first position adjacent said first portion to a second position remote therefrom, said first and second portions together defining a closed cavity, a battery supported within said cavity and adapted to power said load, and latch means on said housing releasably securing said second portion in said first position.

2. A device as defined in claim 1 wherein said latch means comprises a member movable on said housing from a first position where it is adapted to hold said second portion in its first position, to a second position where said second portion is released.

3. A device as defined in claim 2 which includes detent means for holding said latch member in its first position.

4. A device as defined in claim 2 wherein said latch member comprises a ring turnable on said housing and having a projection adapted to engage said handle second portion.

5. A device as defined in claim 4 wherein said housing has a spring pressed ball adapted to engage a recess on said ring when said ring is in its first position.

6. A device as defined in claim 3 wherein said detent means is constructed to hold said latch member in its second position.

7. A device as defined in claim 1 wherein said handle first and second portions are pivotally interconnected.

8. A device as defined in claim 1 wherein said load is an electric motor.

References Cited

UNITED STATES PATENTS

| 3,173,417 | 3/1965 | Horner | 310—50 X |
|---|---|---|---|
| 3,186,878 | 6/1965 | Filander | 136—173 |
| 3,194,688 | 7/1965 | Riley | 136—173 |
| 3,311,763 | 3,1967 | Jepson et al. | 310—47 X |
| 3,432,703 | 3/1969 | Sheps et al. | 310—50 |

MILTON D. HIRSHFIELD, Primary Examiner

R. SKUDY, Assistant Examiner

U.S. Cl. X.R.

310—47, 50